United States Patent [19]

Düntzen

[11] 4,389,203
[45] Jun. 21, 1983

[54] OVERLOAD CLUTCH BETWEEN A ROPE DRUM BODY AND A ROPE DRUM SHAFT

[75] Inventor: Wilhelm Düntzen, Gladbeck, Fed. Rep. of Germany

[73] Assignee: Industrietechnik Kalenborn GmbH, Kalenborn bei Linz/Rhein, Fed. Rep. of Germany

[21] Appl. No.: 203,416

[22] Filed: Nov. 3, 1980

[30] Foreign Application Priority Data

Nov. 23, 1979 [DE] Fed. Rep. of Germany ....... 2947290

[51] Int. Cl.³ .............................................. F16D 7/02
[52] U.S. Cl. ...................................... 464/34; 464/41; 464/85; 464/87
[58] Field of Search ............... 64/27 R, 27 NM, 30 R, 64/30 D; 464/30, 34, 41, 85, 87

[56] References Cited

U.S. PATENT DOCUMENTS

| | | | |
|---|---|---|---|
| 2,505,120 | 4/1950 | Jackson | 64/27 NM X |
| 2,703,991 | 3/1955 | Kron et al. | 64/27 NM X |
| 2,848,883 | 8/1958 | Dall'Olio | 64/27 NM X |
| 3,675,750 | 7/1972 | Wright | 64/27 NM X |
| 3,942,338 | 3/1976 | Furlette et al. | 64/30 D |
| 4,143,525 | 3/1979 | Major | 64/27 NM X |
| 4,214,458 | 7/1980 | Philleo | 64/27 NM X |
| 4,307,584 | 12/1981 | Sandiumenge | 64/27 NM X |
| 4,308,728 | 1/1982 | Croset | 64/27 NM X |

FOREIGN PATENT DOCUMENTS 35284  9/1957  Luxembourg ...................... 64/30 D

*Primary Examiner*—John Petrakes
*Attorney, Agent, or Firm*—Balogh, Osann, Kramer, Dvorak, Genova & Traub

[57] ABSTRACT

An overload clutch for a winch or the like offering a rolling or compression resistance between the rope drum and the rope drum power axle.

The rope drum is connected at one flange to the power axle via an ancillary compensation member in the form of an inwardly running drum body or shaft. Placed between the rope drum and the ancillary compensation member are a plurality of rollers, made of an elastic material, and assembled together in the form of a roller cage. The rollers, which are oval in cross-section, are bonded to roller axles and are separated from each other by spacer rods. The interaction of the rollers with the rope drum and the ancillary compensation member is responsible for a non-positive driving connection between the rope drum and the power axle.

7 Claims, 3 Drawing Figures

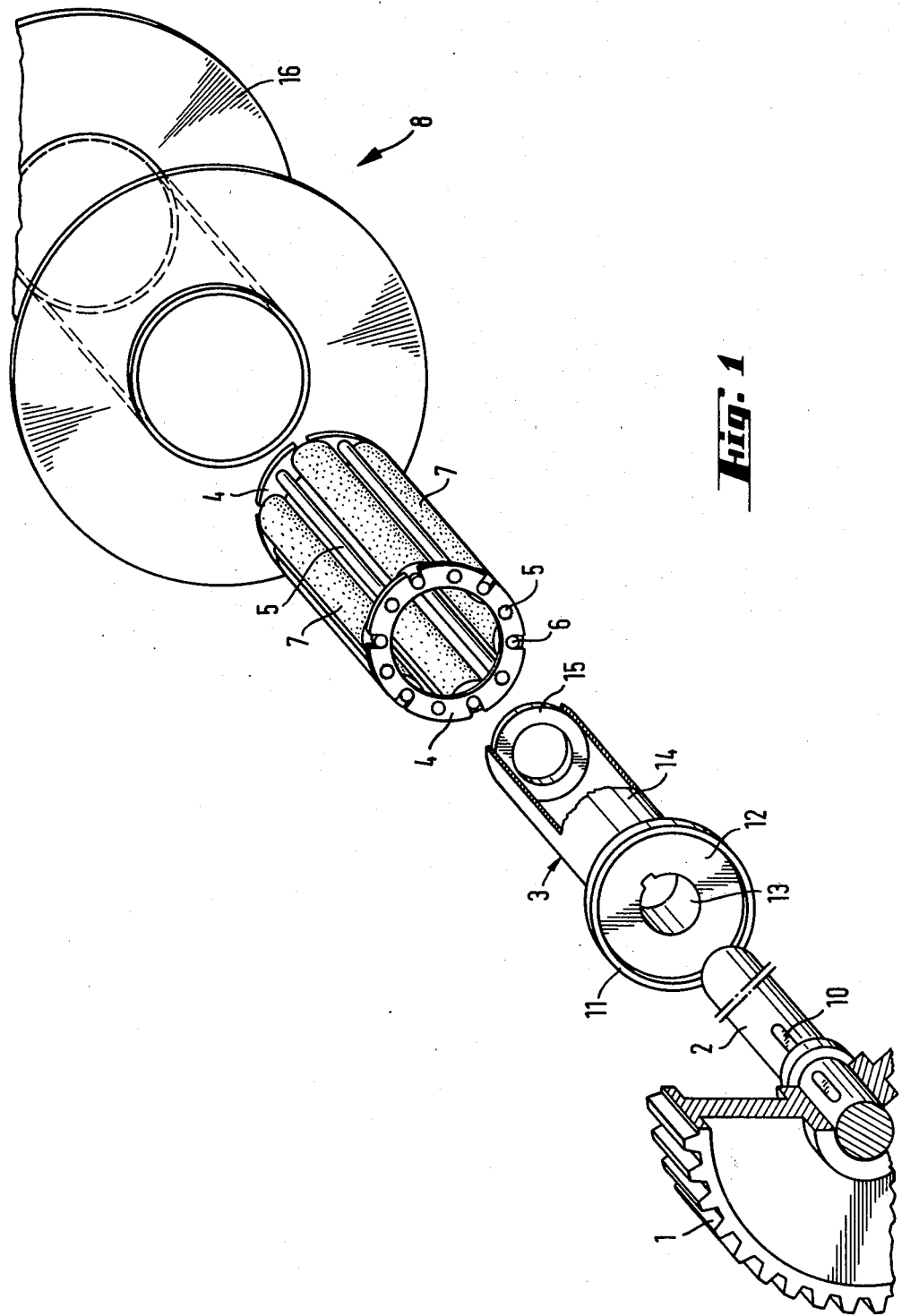

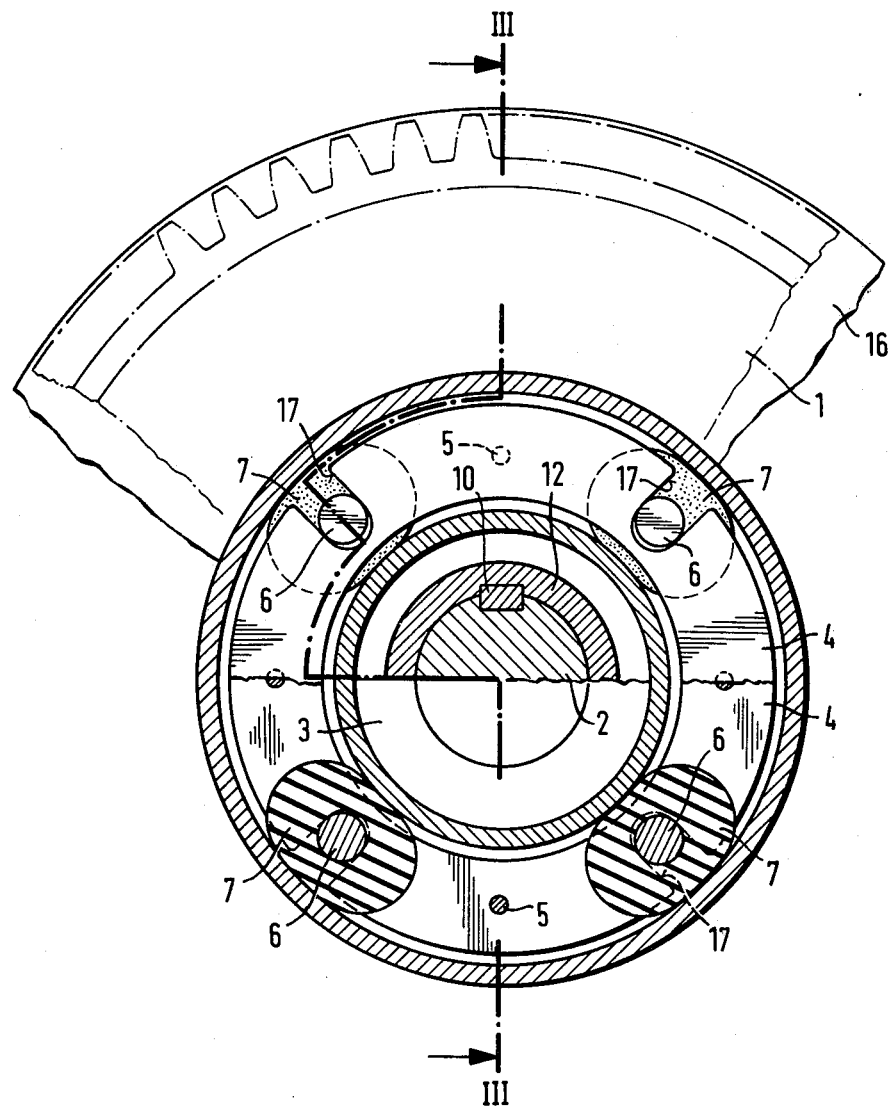

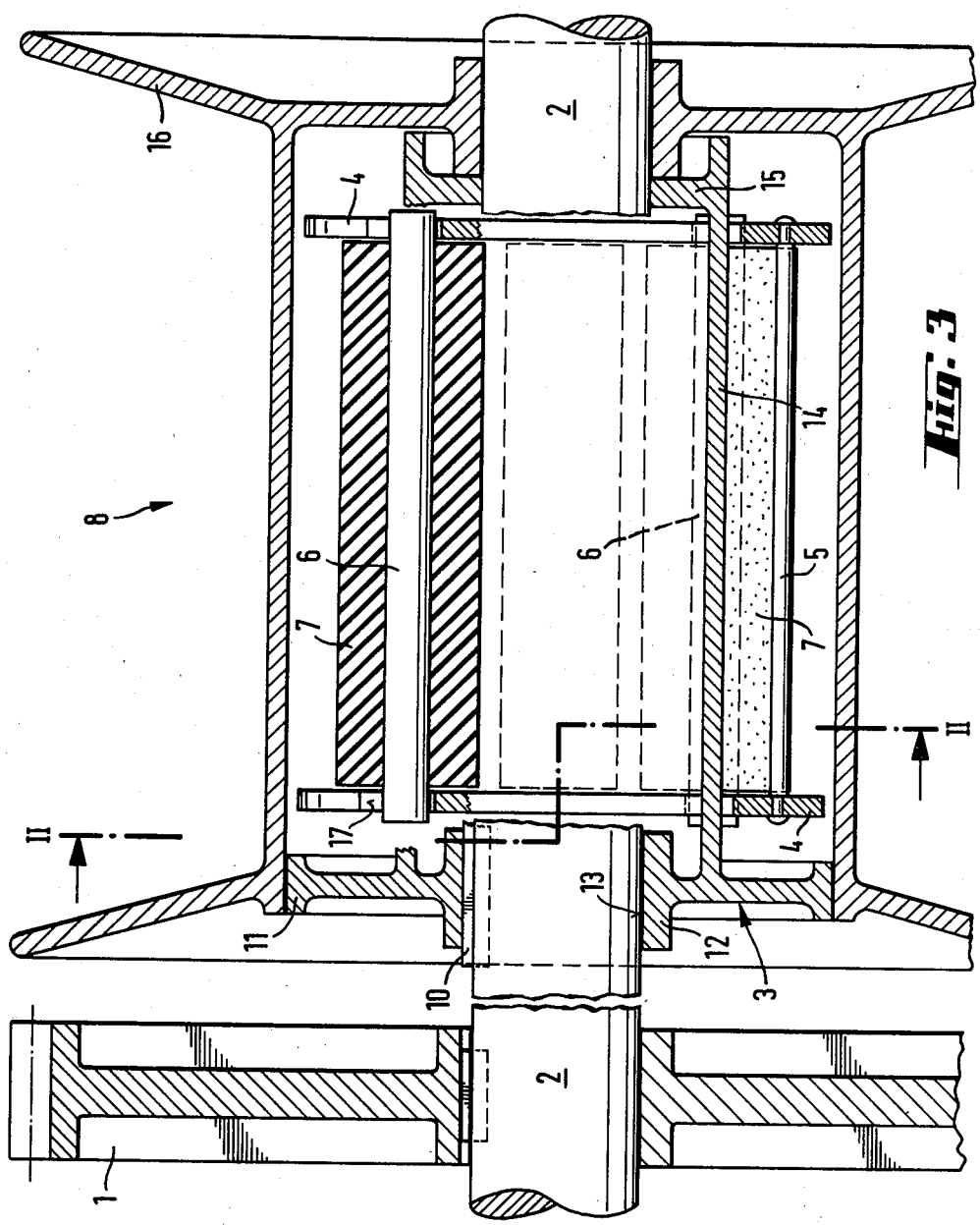

OVERLOAD CLUTCH BETWEEN A ROPE DRUM BODY AND A ROPE DRUM SHAFT

BACKGROUND OF THE INVENTION

The present invention relates generally to an overload clutch for winches or the like, and more particularly to an overload clutch for use underground, between the rope drum and the internally running rope drum shaft. An account of such an overload clutch is given in the German patent application No. P 26 29 821.5-22. Although such an overload clutch is responsible for useful effects, the rubber-elastic filling between the rope drum and the rope drum shaft will only have a short working life and frequently has to be replaced, if the clutch is frequently overloaded.

As a further development of the known measure, in which a sliding, frictional and squeezing effect is produced, an attempt has now to be made to put an end to the sliding and frictional effects.

SHORT OVERVIEW OF THE INVENTION

The present invention, which contemplates an overload clutch of the sort noted at the start, provides for improved features and elements offering a rolling pressing and/or compression resistance between the rope drum and the rope drum power axle.

Preferably, placed between the rope drum power axle and the rollers responsible for the compression resistance (which rollers are encaged or assembled together in the form of a roller cage), there is an ancillary compensation member in the form of an inwardly running drum body or shaft for joining the power axle with the rope drum.

The rollers are best made of an elastic material fixed on the roller axles and are oval in cross-section; more specially, the material of the rollers is bonded or vulcanized on the roller axles.

In the assembled condition, the major axis of the oval rollers is lined up in the tangential direction with respect to a circle concentric with respect to the axle. By the turning motion of the power-turned axle and by contact with the outer (rope drum) and inner (ancillary compensation member) drums, turning of the rollers is forced to take place and they are responsible for a non-positive driving connection: The winch or the like may now be used normally. On jamming, that is to say when the rope drum is stopped, the moment of inertia will be used up till the driving machine is stopped, because the rollers (spaced by the roller cage) may be squeezed into a round form. They are completely rolled over and take on their oval form again in the free space between the inner and outer drums and are able to take the form of a new non-positive connection again. Dependent on the machine speed, one complete rolling over cycle will be necessary for this.

Unlike the conventional rope drums (for example of the sort noted), the rope drum, according to the present invention, is no longer slippingly or non-positively joined with the power axle at its flanges by way of keys. The rope drum has only one flange, with which it is supported on the axle, because the flange hole or eye is designed as a plain bearing and, at this point, the axle takes the form of a shaft connection.

The overload function comes into play when, because of jamming of the load on the winch, the rope drum is stopped. Due to the moment of inertia of the driving machine, and because of the rollers offering a greater and greater resistance to deformation, the ancillary compensation member is moved in relation to the rope drum while, at the same time, motion compensation takes place. Even if the moment of inertia is not used up in half a turn of the rollers about their axes, the rollers will be turned into a new ready-position, starting with which the rest of the moment of inertia may then be used up. On use within the rated range, the rollers with the roller axles in the bearing holes, are only turned through a small number of degrees; on changing conditions of load, only oscillation takes place while it is only in the case of jamming that a roller axle will be completely and fully turned.

At least one bearing hole is normally shut off. Preferably, however, the two bearing holes for the roller axles are designed as slots, which are open in an outward direction. The useful effect here is that less work is needed to put in new rollers.

The measures of the present invention as related to the rollers may, generally speaking, be undertaken using any elastic material for the roller material. Other forms or shapes as well as an oval form or shape are possible for the rollers for certain design purposes.

DETAILED ACCOUNT OF WORKING EXAMPLES

An account in detail will now be given of working examples of the invention, using the accompanying figures.

FIG. 1 is an exploded, perspective view of one form of the invention.

FIG. 2 is a cross-section through the working example in the assembled condition.

FIG. 3 is a lengthways section, running through one roller of the working example of FIG. 2.

The rope drum 8 is of such a form that, on the one hand it has a flange 16 for the inwardly running drum body or shaft (See the description below of ancillary compensation member 3), with which the rope drum 8 is supported on the power axle and takes the form of a free bearing. On the other hand, it has another flange 16 which is not joined with the inwardly running drum body or shaft, but is designed as a supporting bearing. The flange 16 is designed for receiving an inwardly running drum body or shaft and is supported on axle 2. The point of connection between the flange 16 and the power axle 2 is keyed by key 10. A great amount of free space is present between this inwardly running drum body or shaft and the rope drum 8, because, in this free space, a roller cage, having oval overload rollers 7 of elastic material (for producing a connection between axle 2 and rope drum 8) may be placed. Because of the rollers touching the inner (ancillary compensation member 3) and outer (rope drum 8) drums, these rollers are turned about their own axes by turning of the power axle 2, the rollers then forming a non-positive connection so that power transmission may take place for the winch.

The rope drum 8 is, for this reason, designed in more than one part. It has only one flange 16 for connecting to the power axle 2. This flange 16 does not have a normal connection using a key and keyway; the hole in the flange is designed as a plain bearing (for receiving the ancillary compensation member 3 with the roller cage), the axle 2 becoming in this case a shaft connection. The direct connection with the axle takes place by way of an ancillary compensation member 3, which is shaped in the form of a drum body or shaft, for inwardly running in rope drum 8, and is supported on axle 2 at one end by way of a support flange 15. The other end has the flange bearing 12 with the non-positive connection by way of key 10. The outer ring 11 of the flange bearing 12 is machined as a plain bearing support ring, answering to the size of the rope drum 8.

As may more specially be seen from FIGS. 2 and 3, the ancillary compensation member 3 and the rope drum 8 may be freely turned in relation to each other and it is only on putting into place the rubber rollers of oval design (in the present case encaged or assembled together in a roller cage), that force is transmitted. The rubber rollers 7 are so designed that their minor diameter axis is exactly equal to a circle between two turning parts, while the major diameter axis is much greater in size, its size being dependent on the force to be transmitted and the material of which the rollers are made. The non-positive connection is produced when the compensation member 3 is turned by way of axle 2 and the gearwheel clockwise or counterclockwise. The oval rollers 7 turn about their own axes in the free space and thus cause a blocking function to such a degree that the rope drum 8 is moved as well, so that the load on the rope is moved (for example lifted), as well. For exact axial guiding of rollers so as to be parallel, the rollers are positioned and assembled together, with the help of their roller axles 6, and spacer rods 5 together with flange rings 4 in the roller cage. Flange rings 4 are provided with bearing holes or eyes for receiving the rollers 7 therein. A useful effect is produced (as shown in FIGS. 1 and 2) if the bearing holes or eyes are in the form of a slot 17, which may be open in an outward direction, for making assembly more readily possible. The spacer rods 5 serve to space and separate the rollers in the cage one from another. When the load is jammed, the rope drum will be stopped by the load rope, because the moment of inertia of the driving machine is responsible for turning the ancillary compensation member 3 in relation to rope drum 8, the rollers 7 offering more and more resistance to deformation, while, at the same time, causing compensation of motion or to put it differently, letting relative motion take place. If the moment of inertia is not used up on twisting the rollers 7 through half a turn, the rollers will be turned right over into a new ready-position. Within the rated load range, the rollers 7 with the roller axles 6 are only turned in bearing holes or eyes 17 through one or two degrees, this, under most load conditions, only being responsible for oscillation: It is only in the case of jamming that the roller axles will be completely turned by the bearing eyes.

The flanges 12, 15 and 16 are made broad enough for stopping wear; the guide faces, that is to say the bearing faces, are generally covered with self-oiling sintered metal. It is only the roller bodies which are made of elastic material.

Because the roller axle 6 is round, the roller material does not undergo overly great squeezing loads and overfast fatigue of the roller material is not to be feared. The drive by way of gearwheel 1 takes place in a normal way.

In the top half section of FIG. 2, it will be seen how the rollers are positioned resting with full contact against the inner (ancillary compensation member 3) and outer (rope drum 8) drums at the ends of their minor diameters. Four rollers will be seen, although a greater number would be possible, more specially if there would otherwise be a chance of axle 2 moving out of its desired position. However, for reasons of symmetrical distribution of force, a design with less than three rollers would have shortcomings.

The machine is supplied, furthermore, by way of a pressure reducing valve so that, on supplying the compressed air to the drive for the gearwheel, it will be limited, for example, to 4 bar. This force is not so great that the rope will be broken. However, even at very high force levels, there will only be a rolling motion of rollers 7; the system is safeguarded against wear because of the rolling motion, that is to say even uneven face parts, for example on the inner face of rope drum 8 or on the outer face of sleeve body 14, are simply rolled over.

In a further working example of the invention, it is possible for the rollers to be assembled completely freely, that is to say without being encaged or assembled in a cage, a measure, however, having to be taken for stopping the rollers together with their axles, when moving out of line with the rope drum 8 or the inwardly running drum body or shaft.

On assembly (see FIG. 1), the compensation member 3 is slipped over onto axle 2 and locked using a key. The rollers, seated in their roller cage, are slipped over onto the compensation body 3 and then, using a small force, rope drum 8 is slipped over onto them.

I claim:
1. An overload clutch for use between a rope drum and a rope drum power axle, comprising:
    an ancillary compensation member shaped in the form of a drum shaft and mounted on said power axle,
    a roller cage provided with a plurality of roller axles and spacer rods and mounted on the ancillary compensation member, and
    a plurality of rollers made of an elastic material and mounted on said roller cage, each of the plurality of rollers being fixed to one of said plurality of roller axles, respectively,
    said spacer rods spacing and separating the rollers in the cage one from another,
    said roller cage including said plurality of rollers being disposed between said rope drum and the ancillary compensation member so as to offer rolling and compression resistance therebetween.

2. An overload clutch as claimed in claim 1, wherein the rollers have an oval cross-section.

3. An overload clutch as claimed in claim 1, wherein the rollers are made of rubber bonded onto said roller axles.

4. An overload clutch as claimed in claim 1, wherein said roller cage is provided with flange rings, each of said flange rings being provided with bearing holes in the form of outwardly opened slots for receiving the rollers therein.

5. An overload clutch as claimed in any one of claims 1-4, wherein the ancillary compensation member has on one end thereof, a support flange for supporting thereof on said power axle, and on the other end thereof, a flange bearing for locking onto said power axle by way of a key.

6. An overload clutch as claimed in claim 1, wherein the ancillary compensation member is provided on one end thereof with a flange bearing for locking onto said power axle by way of a key, said flange bearing having an outer ring formed as a plain bearing support ring and proportional to the size of said rope drum.

7. An overload clutch as claimed in claim 6, wherein said rope drum has a flange provided with a hole designed as a plain bearing for receiving the ancillary compensation member.

* * * * *